United States Patent
Breese

[11] Patent Number: 6,001,018
[45] Date of Patent: *Dec. 14, 1999

[54] METHOD OF MANUFACTURING A DRIVE LINE ASSEMBLY

[75] Inventor: Douglas E. Breese, Northwood, Ohio

[73] Assignee: Dana Corporation, Toledo, Ohio

[*] Notice: This patent is subject to a terminal disclaimer.

[21] Appl. No.: 08/871,891

[22] Filed: Jun. 9, 1997

Related U.S. Application Data

[62] Division of application No. 08/407,769, Mar. 21, 1995, Pat. No. 5,637,042, and a division of application No. 08/545,481, Oct. 19, 1995, Pat. No. 5,643,093.

[51] Int. Cl.⁶ .................................................. F16C 3/02
[52] U.S. Cl. ......................... 464/183; 464/134; 464/179
[58] Field of Search ................................. 464/134, 179, 464/181, 182, 183

[56] References Cited

U.S. PATENT DOCUMENTS

| | | | |
|---|---|---|---|
| 2,291,420 | 7/1942 | Swenson . | |
| 2,559,485 | 7/1951 | Warner | 464/136 |
| 2,577,692 | 12/1951 | Slaght . | |
| 2,751,765 | 6/1956 | Rowland et al. | 464/181 |
| 3,479,030 | 11/1969 | Merola . | |
| 3,854,316 | 12/1974 | Wilson . | |
| 4,161,273 | 7/1979 | Jeffers . | |
| 4,192,153 | 3/1980 | Fisher . | |
| 4,279,275 | 7/1981 | Stanwood et al. | 464/181 |
| 4,307,833 | 12/1981 | Barnard . | |
| 4,348,874 | 9/1982 | Muller et al. . | |
| 4,358,284 | 11/1982 | Federmann et al. | 464/183 |
| 4,380,443 | 4/1983 | Federmann et al. . | |
| 4,421,497 | 12/1983 | Federmann et al. . | |
| 4,527,978 | 7/1985 | Zackrisson | 464/182 |
| 4,561,799 | 12/1985 | Arena . | |
| 4,663,819 | 5/1987 | Traylor . | |
| 4,788,841 | 12/1988 | Calhoun et al. . | |
| 4,881,924 | 11/1989 | Gall . | |
| 4,932,924 | 6/1990 | Lobel | 464/181 |
| 4,952,195 | 8/1990 | Traylor . | |
| 5,309,620 | 5/1994 | Shinohara et al. . | |
| 5,320,579 | 6/1994 | Hoffmann | 464/183 |
| 5,342,243 | 8/1994 | Seksaria et al. . | |
| 5,397,272 | 3/1995 | Smiley et al. | 464/183 |
| 5,607,524 | 3/1997 | Klemp et al. . | |
| 5,637,042 | 6/1997 | Breese | 464/183 |
| 5,643,093 | 7/1997 | Breese | 464/183 |

FOREIGN PATENT DOCUMENTS

| | | | |
|---|---|---|---|
| 73731 | 6/1978 | Japan | 464/183 |
| 40-5024455 | 2/1993 | Japan | 464/134 |
| 2040395 | 8/1980 | United Kingdom | 464/183 |

*Primary Examiner*—Eileen Dunn Lillis
*Attorney, Agent, or Firm*—MacMillan, Sobanski & Todd, LLC

[57] ABSTRACT

A method of manufacturing a drive line assembly includes the initial step of providing a driveshaft tube formed from a metallic material and having a substantially uniform wall thickness. The driveshaft tube terminates in an axially extending cylindrical end portion. Then, a diameter reducing portion is provided that is formed from a metallic material and has a substantially uniform wall thickness. The diameter reducing portion includes an axially extending cylindrical first end which is co-axial with and permanently fixed to the axially extending cylindrical end portion of the driveshaft tube. The diameter reducing portion further includes an axially extending cylindrical second end. The axially extending cylindrical first end of the diameter reducing portion defines a first diameter, and the axially extending cylindrical second end of the diameter reducing portion defines a second diameter. The first diameter is larger than the second diameter. Lastly, a tube yoke is provided that is formed from a metallic material and includes a pair of opposed lug ears having respective orifices formed therethrough. The tube yoke includes an axially extending cylindrical end portion which is co-axial with and permanently fixed to the axially extending cylindrical second end of the diameter reducing portion for axial and rotational movement therewith.

26 Claims, 3 Drawing Sheets

METHOD OF MANUFACTURING A DRIVE LINE ASSEMBLY

CROSS REFERENCE TO RELATED APPLICATIONS

This application is a division of Ser. No. 08/407,769 filed Mar. 21, 1995, now U.S. Pat. No. 5,637,042 issued Jun. 10, 1997, and a division of Ser. No. 08/545,481 filed Oct. 19, 1995, now U.S. Pat. No. 5,643,093 issued Jul. 1, 1997.

BACKGROUND OF THE INVENTION

This invention relates in general to drive train assemblies for transferring rotational power in vehicles. In particular, this invention relates to an improved method of manufacturing a drive line assembly for transmitting rotational power from an engine to an axle assembly in a vehicle.

In most land vehicles in use today, a drive train assembly is provided for transmitting rotational power from an output shaft of an engine/transmission assembly to an input shaft of an axle assembly so as to rotatably drive the wheels of the vehicle. To accomplish this, a typical vehicular drive train assembly includes a hollow cylindrical driveshaft tube. A first universal joint is connected between the output shaft of the engine/transmission assembly and the driveshaft tube, while a second universal joint is connected between the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

It is known that when any mechanical body is rotated about an axis, a natural resonant frequency is defined thereby. This natural resonant frequency is an inherent characteristic of the mechanical body and is based upon many factors, including its composition, size, and shape. When the mechanical body is rotated at a speed which is at or near its natural resonant frequency, a relatively large amount of vibration can occur. In the context of a vehicular driveshaft tube, the natural resonant frequency is often referred to as the "critical speed" thereof. Thus, when a driveshaft tube is rotated at or near its critical speed, it can begin to vibrate excessively. Such vibration can, at a minimum, generate undesirable noise in the vehicle during operation. More seriously, this vibration can cause excessive stresses and rapid failure of not only the driveshaft tube, but the other components of the drive train assembly connected thereto. Accordingly, an important consideration in the design and manufacture of driveshaft tubes and other drive train assembly structures is that they not be operated at or near their critical speeds in normal operation.

Thus, the critical speed for a driveshaft tube is a function of, among other things, the nature of the material used to form the driveshaft tube. Generally speaking, the lighter the material used to form the driveshaft, the lower the critical speed. Traditionally, vehicular driveshaft tubes have been formed from steel alloys. Steel alloys have been found to be acceptable materials not only because they possesses sufficient strength to transmit the rotational loads which are normally encountered during use, but also because they are relatively heavy and stiff materials. As a result, the critical speed of steel alloy driveshaft tubes is usually sufficiently high that it is not encountered during normal operation of the vehicle. Unfortunately, because they are relatively heavy materials, steel alloys contribute an undesirable amount to the overall weight of the vehicle. To address this, driveshaft tubes have more recently been formed from lighter weight alternative materials, such as aluminum alloys. Aluminum alloys have been found to be desirable for use in vehicular driveshaft tubes because they are much lighter than steel alloys, yet possess sufficient strength to transmit the rotational loads therethrough. Unfortunately, for this same reason of lighter weight, the critical speed of an aluminum alloy driveshaft tube is usually much lower than the critical speed of a comparably sized steel alloy driveshaft tube. The critical speeds of typical aluminum alloy driveshaft tubes have been found to be undesirably close to the normal operating speeds of the vehicle than comparable steel alloy driveshaft tubes.

As mentioned above, the critical speed for a driveshaft tube is also a function of the size and shape of the driveshaft tube. Generally speaking, the longer the driveshaft tube is in length and the smaller it is in diameter, the lower the critical speed. The use of aluminum alloys has allowed the replacement of traditional two-piece steel alloy driveshaft tubes with newer one-piece aluminum alloy driveshaft tubes. The newer one-piece driveshaft tubes are preferable to the traditional two-piece steel alloy driveshaft tubes because fewer parts are required. However, because they are longer in length, one-piece aluminum alloy driveshaft tubes have a lower critical speed than a comparably sized two-piece steel alloy driveshaft tubes, undesirably close to the normal operating speeds of the vehicle than comparable steel alloy driveshaft tubes.

Attempts have been made to alter the critical speed of one-piece aluminum alloy driveshaft tubes to facilitate their use in vehicles. For example, it is known that the critical speed of an aluminum alloy driveshaft can be increased by covering it with a coating of a high strength material, such as a resin matrix reinforced with graphite fibers. Though effective, the use of such a covering undesirably increases manufacturing costs. It would be advantageous, therefore, to provide an improved structure for a driveshaft tube which would enable the use of lighter weight aluminum alloys, yet would not require the use of relative expensive reinforcing coatings to raise the critical speed thereof above the normal operating speed of the vehicle.

SUMMARY OF THE INVENTION

This invention relates to an improved manufacturing a vehicular drive train assembly method of manufacturing a drive line assembly that includes the initial step of providing a driveshaft tube formed from a metallic material and having a substantially uniform wall thickness. The driveshaft tube terminates in an axially extending cylindrical end portion. Then, a diameter reducing portion is provided that is formed from a metallic material and has a substantially uniform wall thickness. The diameter reducing portion includes an axially extending cylindrical first end which is co-axial with and permanently fixed to the axially extending cylindrical end portion of the driveshaft tube. The diameter reducing portion further includes an axially extending cylindrical second end. The axially extending cylindrical first end of the diameter reducing portion defines a first diameter, and the axially extending cylindrical second end of the diameter reducing portion defines a second diameter. The first diameter is larger than the second diameter. Lastly, a tube yoke is provided that is formed from a metallic material and includes a pair of opposed lug ears having respective orifices formed therethrough. The tube yoke includes an axially extending cylindrical end portion which is co-axial with and permanently fixed to the axially extending cylindrical second end of the diameter reducing portion for axial and rotational movement therewith.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
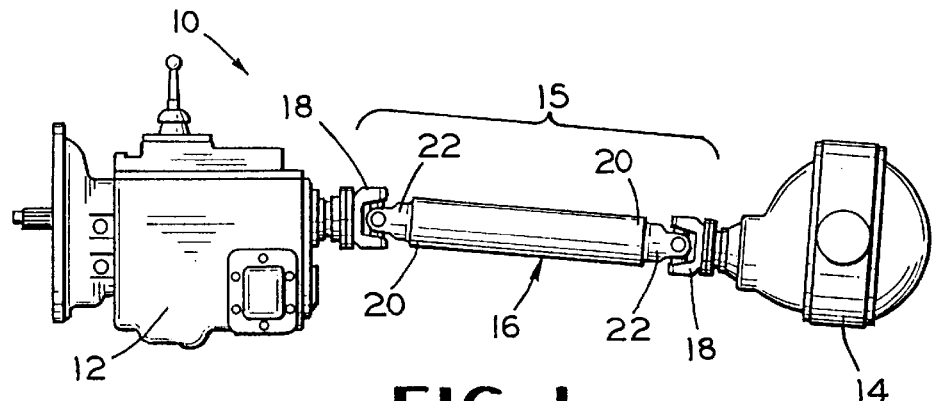
FIG. 1 is an elevational view of a vehicular drive train including a first embodiment of a drive line assembly in accordance with this invention.

As shown in FIG. 1, the drive train, indicated generally at 10, is comprised of transmission 12 connected to axle assembly 14 through drive line assembly 15. The drive line assembly includes a cylindrically shaped driveshaft or driveshaft tube 16. The driveshaft can be of any suitable material, but is preferably hollow and metallic, most preferably of a lightweight aluminum alloy such as a 6061 alloy. As is typical in vehicle drive trains, the transmission output shaft, not shown, and the axle assembly input shaft, not shown, are not co-axially aligned. Therefore, universal joints 18 are positioned at each end 20 of the driveshaft to rotatably connect the driveshaft to the transmission output and the axle assembly input. The connection between the ends 20 of the driveshaft and the universal joints is accomplished by tube yokes 22. The drive train apparatus described thus far is generally conventional, and is well known in the industry.

Figure 2:
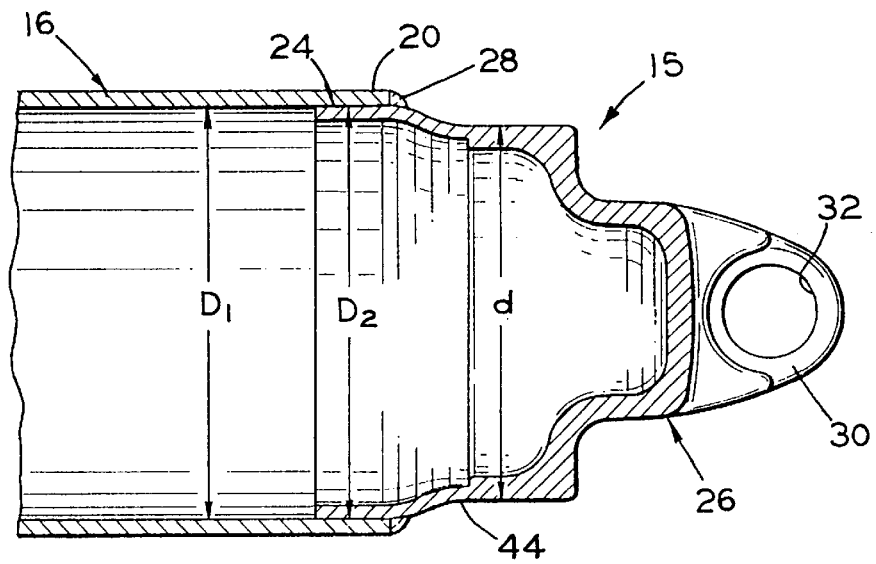
FIG. 2 is an enlarged elevational view, partially in cross-section, of a drive shaft and tube yoke portion of the drive line assembly illustrated in FIG. 1.

As shown more clearly in FIG. 2, the tube yoke 22 is comprised of the tube seat 24 at one end, and the lug structure 26 at the other end. The tube yoke can be made of any suitable material, and is preferably metallic, being of an aluminum alloy. The tube yoke can be made by casting or by forging, and is preferably a formed element which is subjected to a draw and iron stamping process to set the final dimensions of the tube seat outside diameter $D_2$, thereby eliminating the necessity of machining the tube seat. The term "formed element" means that the element is pushed or shaped into its final form without the loss of any material, rather than being machined, turned or milled, which would involve the removal of material to obtain the final form. Since a formed element does not require a machining process, the formed element is less costly to manufacture. Also, the tube yoke is preferably a unitary element, which means it is of one piece, and is not welded, threaded or bolted together.

The draw and iron process is similar to a coining process and involves pressing or punching a workpiece into a draw and iron die. Prior to the draw and iron process, the workpiece is already generally formed into the net shape or final shape of the final part, either by a casting or a forging process. The draw and iron die is made of die steel. Forcing the relatively soft aluminum alloy with a single die stroke into the die, forms and smoothes the forged or cast surface of the tube seat into a part having the desired dimensions, generally within a tolerance of about ±0.002 inches. The draw and iron process is well known to those skilled in the art.

The tube seat is adapted to mate or fit with the end 20 of the driveshaft tube 16 to enable torque to be transmitted between the driveshaft tube and the tube seat. The torque transmitting capacity of the connection between the driveshaft tube and the tube yoke is increased by providing a weld, such as fillet weld 28. Although a fillet weld is preferred, other welds could be used.

Figure 3:
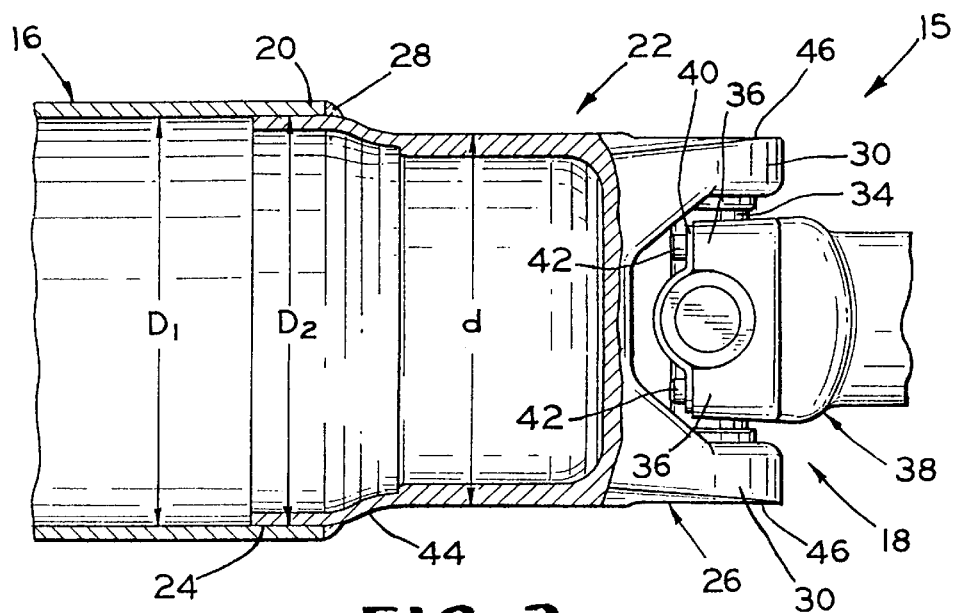
FIG. 3 is a top plan view, partially in cross section, of the drive shaft and tube yoke portion of the drive line assembly illustrated in FIG. 2, rotated 90 degrees from the view in FIG. 2.

The lug structure is comprised of lug ears 30 adapted with cross orifices 32 which receive the universal joint bearing assemblies, not shown in FIG. 2, but shown as universal joint journal cross 34 in FIG. 3. The cross is connected to the end yoke lug ears 36 of the end yoke 38 to form the complete universal joint 18. The end yoke is connected to other rotatable drive train elements. The end yoke lug ears 36 can be held in place around the journal cross bearings by any retaining device, such as by bearing strap 40, as shown in FIG. 3. The bearing strap is secured to the end yoke lug ears by lug bolts 42, which can be threaded into the end yoke lug ears. Access must be provided to the lug bolts during assembly of the drive line assembly in order to secure the bearing strap into place. The lug structure 26 transmits torque through the universal joint, to or from other rotatable drive line elements, such as the transmission 12 and the axle assembly 14.

It can be seen that the generalized diameter d of the lug structure 26 is less than the outside diameter $D_2$ of the tube seat 24. Positioned intermediate the tube seat and the lug structure is the tube yoke diameter reducing portion 44 which provides for a change in diameter of the tube yoke to accommodate both the inside diameter $D_1$ of the enlarged driveshaft tube 16 and the smaller diameter d of the lug structure. It is to be understood that the lug structure is not usually perfectly cylindrical, and therefore does not have a definitive diameter. However, the lug structure usually has oppositely spaced, generally planar or arcuate faces, such as lug faces 46, shown more clearly in FIG. 3, which can be used to provide a generalized diameter of the lug structure. In the preferred embodiment of the invention, the general diameter d of the lug structure is within the range of from about 0.60 to about 0.95 of the tube seat diameter $D_2$. Most preferably, the general diameter d of the lug structure is within the range of from about 0.80 to about 0.93 of the tube seat diameter $D_2$. In a specific embodiment of the drive line assembly 15, the driveshaft and the tube seat are about 5 inches in diameter, and the lug structure is about 4 inches in diameter. This is expected to be sufficient to enable the use of an unreinforced aluminum alloy driveshaft tube while still providing access for tooling during fabrication of the universal joint 18.

The diameter reducing portion 44 is preferably designed with a smooth curve for ease of manufacture, but could also be formed with a step-like diameter reduction. It is important that the diameter reducing portion be positioned far enough away from the lug bolts that the tooling for the lug bolts, such as power wrenches, can be inserted in place. Preferably, the diameter reducing portion is positioned at least 2¾ inches from the lug bolts.

During the fabrication of the drive line assembly 15, the tube seat 24 is inserted into the end 20 of the driveshaft tube 16. The inside diameter $D_1$ of the driveshaft is preferably sized to be slightly smaller than the outside diameter $D_2$ of the tube seat. Preferably, the driveshaft tube inside diameter $D_1$ is within the range of from about 0.980 to about 0.999 of the tube seat diameter $D_2$ prior to the insertion of the tube seat into the driveshaft tube. After the insertion of the tube seat into the driveshaft, the tube seat becomes slightly deformed since at that point the tube seat diameter $D_2$ equals the driveshaft tube inside diameter $D_1$. By making the tube seat diameter $D_2$ slightly larger than the driveshaft tube inside diameter $D_1$ prior to insertion of the tube seat into the driveshaft, the two parts will have an interference fit or press fit, which provides some torque transmitting capacity.

In operation, a drive line assembly 15 includes a relatively large driveshaft tube 16 and a tube yoke 22 fitting within the end 20 of the tube. The tube yoke has a lug structure 26 for connection through a universal joint 18 to other rotating parts of the drive train. The lug structure is relatively smaller in diameter than the driveshaft tube, and the tube yoke is adapted with a diameter reducing portion 44 which provides a transition between the relatively large diameter $D_1$ of the driveshaft tube and the relatively small diameter d of the lug structure. This allows the insertion of the tooling necessary for securing the lug bolts 42 within the universal joint assembly 18.

Figure 4:
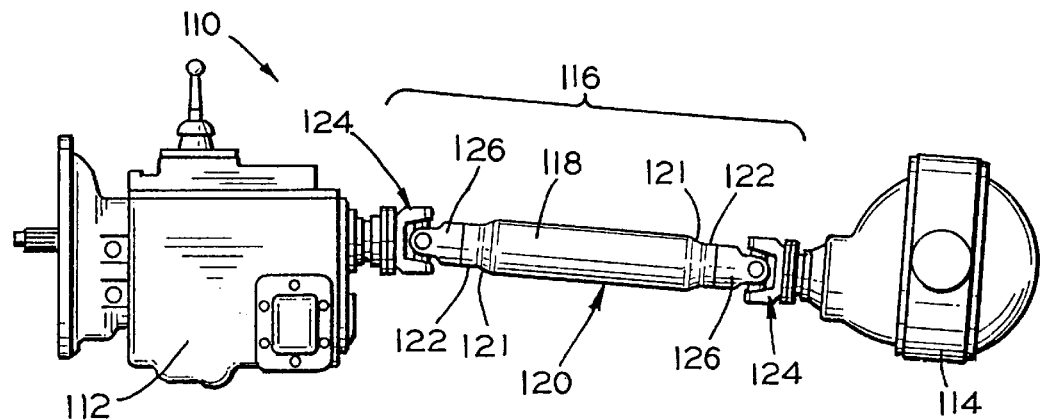
FIG. 4 is an elevational view of a vehicular drive train including a second embodiment of a drive line assembly in accordance with this invention.

Referring now FIG. 4, there is illustrated a vehicle drive train assembly, indicated generally at 110. The drive train assembly 110 includes a transmission 112 having an output shaft (not shown) which is connected to an input shaft (not shown) of an axle assembly 114 through a driveshaft assembly 116. The transmission 112 is rotatably driven by an engine (not shown) which generates rotational power in a conventional manner. The driveshaft assembly 116 includes a cylindrical driveshaft tube 118 having a center portion 120 and opposing end portions 122. As will be explained in greater detail below, the center portion 120 of the driveshaft tube 118 is formed having a larger outer diameter than either of the end portions 122. Thus, a transition region 121 is defined between the larger diameter center portion 120 of the driveshaft 118 and each of the smaller diameter end portions 122 thereof.

Figure 6:
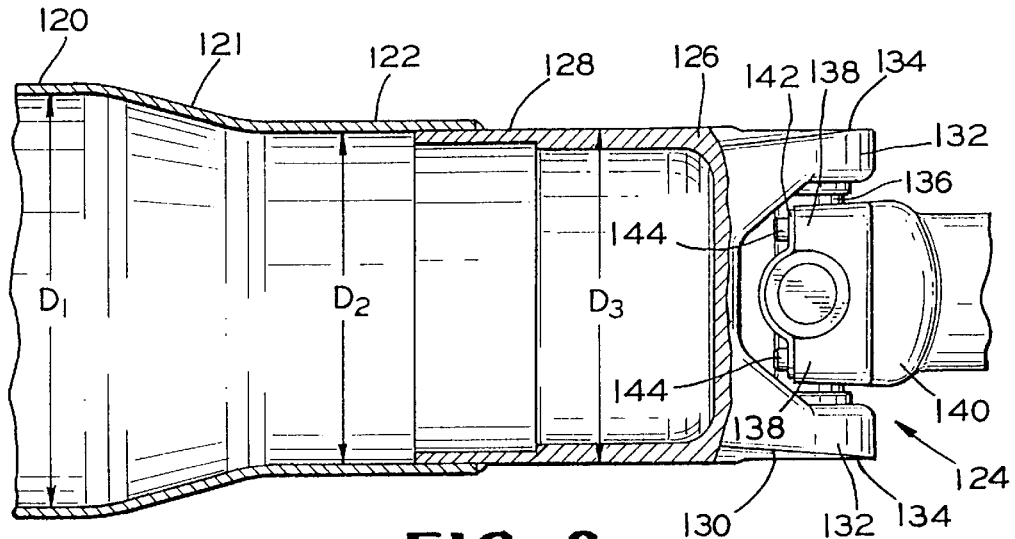
FIG. 6 is a top plan view, partially in cross section, of the drive shaft and tube yoke portion of the drive line assembly illustrated in FIG. 5, rotated 90 degrees from the view in FIG. 5, and wherein the tube yoke connected to a universal joint.

The output shaft of the transmission 112 and the input shaft of the axle assembly 114 are typically not co-axially aligned. To accommodate this, a universal joint, indicated generally at 124, is provided at each of the end portions 122 of the driveshaft tube 118 to rotatably connect the driveshaft tube 118 to the output shaft of the transmission 112 and the input shaft of the axle assembly 114. FIG. 6 illustrates the universal joint 124 provided between the end portion 122 of the driveshaft tube 118 and the input shaft of the axle assembly 114. As shown therein, the universal joint 124 includes a tube yoke 126 which is secured to the end portion 122 of the driveshaft tube 118. The tube yoke 126 is formed having a tube seat 128 at one end and a lug structure 130 at the other end. The tube seat 128 is adapted to be secured to the end portion 122 of the driveshaft 118 to enable torque to be transmitted between the driveshaft tube 118 and the tube yoke 126. The tube seat 128 defines an outer diameter $D_3$ which will be discussed below.

The illustrated tube yoke 126 is a full round yoke, wherein the lug structure 130 includes a pair of opposed lug ears 132 having co-axially aligned cross holes 134 formed therethrough. The cross holes 134 are provided to receive two opposed bearing caps mounted on respective trunnions of a cross 136 (see FIG. 6) in a well known manner. The other two trunnions of the cross 136 are connected to lug ears 138 provided on an end yoke 140 connected to the input shaft of the axle assembly 114. The illustrated end yoke 140 is a half round yoke, including a pair of straps 142 (only one is illustrated) which surround the bearing caps mounted on the end of the respective trunnions to retain them therewith. The straps 142 are secured to the lug ears 138 by bolts 144 which can be threaded into the lug ears 138. The universal joint 124 provided between the output shaft of the transmission 112 and the end portion 122 of the driveshaft tube 118 has a similar structure.

Figure 7:
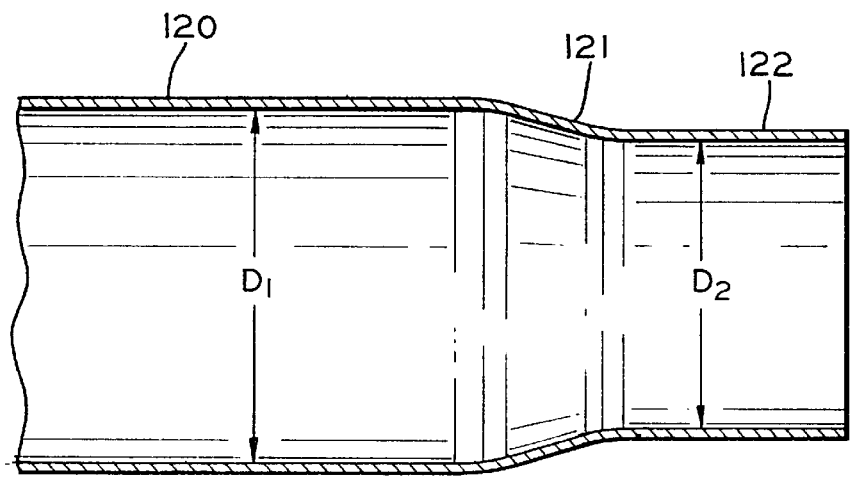
FIG. 7 is a cross-sectional view illustrating of one end of a driveshaft illustrated in FIGS. 4, 5, and 6.

The structure of the driveshaft tube 118 of this invention is illustrated in more detail in FIG. 7. As shown therein, the center portion 120 of the driveshaft tube 118 defines an inner diameter $D_1$ which is larger than an inner diameter $D_2$ defined by the end portion 122 of the driveshaft tube 118. As discussed above, the transition region 121 extends between the larger center portion 120 of the driveshaft tube 118 and the end portion 122. Preferably, the inner diameter defined by the transition region 121 reduces in a smooth curve from the larger diameter center portion 120 to the smaller diameter end portion 122 for ease of manufacture and more uniform stress distribution. Referring back to FIGS. 5 and 6, it can be seen that the inner diameter $D_2$ of the end portion 122 of the driveshaft 118 is approximately the same as the outer diameter $D_3$ of the tube seat 128 provided on the tube yoke 126. Thus, the outer diameter $D_3$ of the tube seat 128 is smaller than the inner diameter $D_1$ of the center portion 120 of the driveshaft tube 118. Either one end portion 122 or both end portions 122 of the driveshaft 118 can be formed in this manner.

Preferably, the inner diameter $D_2$ of the end portion 122 of the driveshaft tube 118 is within the range of from about 73% to about 85% of the inner diameter $D_1$ of the center portion 120 of the driveshaft tube 118. Most preferably, the inner diameter $D_2$ of the end portion 122 of the driveshaft tube 118 is within the range of from about 78% to about 85% of the inner diameter $D_1$ of the center portion 120 of the driveshaft tube 118. In a specific preferred embodiment of the invention, the center portion 120 of the driveshaft tube 118 has an inner diameter $D_1$ of about five inches, while the end portion 122 of the driveshaft tube 118 has an inside diameter $D_2$ of about four inches. These dimensions provide an excellent unreinforced aluminum alloy driveshaft which facilitates access for tooling during assembly of the universal joint 124.

The method of forming the driveshaft tube 118 of this invention will now be explained. Initially, a driveshaft tube blank is provided having a predetermined first diameter. The driveshaft tube blank is initially heat treated to achieve a relatively soft temper and, therefore, a desired elongation factor. The driveshaft tube blank can be formed from any suitable material but is preferably formed from an aluminum alloy metal. A preferred process for forming the driveshaft includes both extrusion and drawing. In this process, a solid aluminum alloy cylinder or billet is placed into an extrusion press. A rod is forced through the middle of the solid aluminum alloy cylinder or billet to form the internal diameter of the driveshaft tube blank. The aluminum alloy cylinder or billet is then forced around an inner mandrel and through an extrusion die to form the extruded driveshaft tube blank. At this point, the shape of the driveshaft is close to the desired final shape. The extruded driveshaft is then subjected to a drawing operation to refine the dimensions and properties thereof. The process provides a hollow aluminum alloy driveshaft tube blank of the desired inside diameter, thickness, and amount of cold work. The inside diameter of the driveshaft tube blank at this point is equal to the inside diameter $D_1$ discussed above.

The above-mentioned heat treating operation can be performed during formation of the driveshaft tube blank, for example between the extrusion and drawing steps, or it can be performed after the driveshaft tube has been formed by extrusion and drawing. The heat treated driveshaft tube will possess a desired elongation factor so that the end portions 120 can be reduced or swaged into a desired shape. Preferably, the elongation factor of the driveshaft tube after this heat treating operation is between about 15% and about 22%, and more preferably about 20%.

Figure 8:
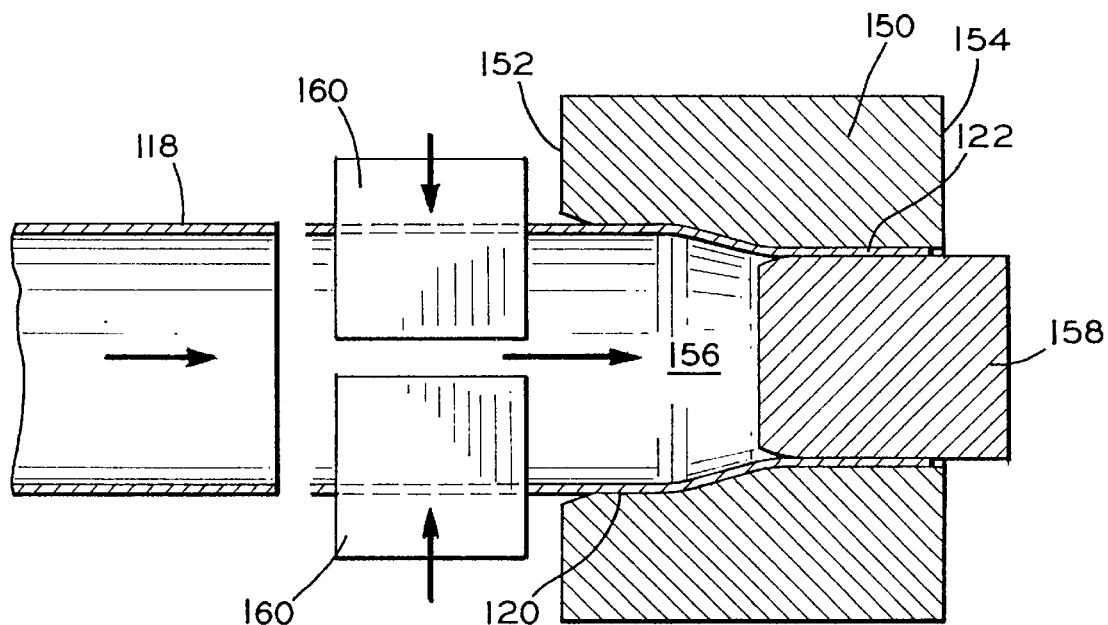
FIG. 8 is a schematic cross-sectional view of a push pointing operation for swaging the end portion of the driveshaft illustrated in FIGS. 4 through 7.

Taking advantage of this higher elongation factor for the material, the end portion 122 of the driveshaft tube is then swaged to reduce the diameter thereof to a second predetermined inside diameter. This reduced inside diameter is equal to the inside diameter $D_2$ discussed above. Any of the several well-known methods for swaging metal can be used to form the end portions 120 of the driveshaft tube 118. A preferred method of swaging the end portion of the driveshaft is a push pointing operation, which is illustrated in FIG. 8. In this method, the driveshaft tube is pushed axially into a reducing push point die 150. The push point die 150 includes a front surface 152 which faces toward the driveshaft tube blank and a rear surface 154 which faces away from the driveshaft tube. A cylindrical opening 156 is formed through the push point die 150 having a larger diameter near the front surface 152 and a smaller diameter near the back surface 154. A mandrel 158 is positioned inside the opening 156 in the smaller diameter portion thereof. The mandrel 158 has an outer diameter which is equal to the desired inside diameter $D_2$ of the end portion 122 of the finished driveshaft tube 118. Grippers 160 are provided which engage the outer surface of the driveshaft tube and force it into the opening 156 of the push point die 150. As the driveshaft tube is pushed axially into the opening 156, the leading end thereof is reduced in diameter by engagement with the die 150 and the mandrel 158 to form the end portion 122 of the driveshaft tube 118. The remaining portion of the driveshaft tube retains the larger diameter size to form the center portion 120 of the driveshaft tube 118. Alternatively, the end portion 122 can be formed by rotary swaging. Rotary swaging employs a die which rotates while it alternately rapidly collapses and expands in a radial direction, much like a hammer. The end portion of the driveshaft tube is pushed into the die, and the die hammers the end portion of the driveshaft tube down into the desired reduced diameter.

Alternatively, the driveshaft tube can be held stationary by the grippers 160 while the reducing push point die 150 is forced axially over the tube. The use of the mandrel 158 is optional.

After this swaging operation is performed, the driveshaft tube 118 is again heat treated by subjecting it to an elevated temperature for a predetermined time. This heat treatment is performed to achieve a relatively hard temper to meet the strength requirements for use. This produces a driveshaft 118 in accordance with the present invention.

Figure 5:
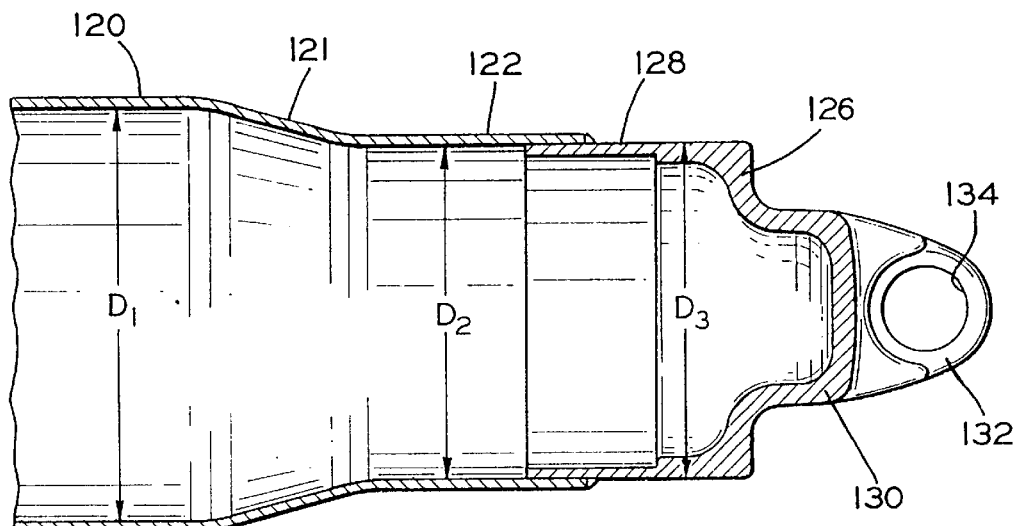
FIG. 5 is an enlarged elevational view, partially in cross section, of a drive shaft and tube yoke portion of the drive line assembly illustrated in FIG. 4.

The end portion 122 of the driveshaft 118 is secured to the tube yoke 126 as shown in FIG. 5. Specifically, the tube seat 128 of the tube yoke 126 is inserted within the end portion 122 of the driveshaft 118. The inside diameter $D_2$ of the end portion 122 of the driveshaft 118 is preferably sized to be slightly smaller than the outside diameter $D_3$ of the tube seat 128. Preferably, the inside diameter $D_2$ of the end portion 122 of the driveshaft 118 is within the range of from about 98% to about 99.9% of the outside diameter $D_3$ of the tube seat 128 prior to the insertion of the tube seat 126 into the driveshaft tube 118. After such insertion, the tube seat 126 is slightly deformed since the outside diameter $D_3$ of the tube seat 128 equals the inside diameter $D_2$ of the end portion 122 of the driveshaft 118. By making the tube seat diameter $D_3$ slightly larger than the inside diameter $D_2$ prior to insertion of the tube seat 126 into the driveshaft tube 118, the two parts will have an interference fit or press fit which provides some torque transmitting capacity. The torque transmitting capacity of the connection between the driveshaft 118 and the tube yoke 126 is increased by providing a weld.

While the first and second predetermined diameters have been discussed hereinabove as inside diameters of the driveshaft, they could also be outside diameters if the tube yoke was secured outside the end portion of the driveshaft instead of fitting inside the end portion of the driveshaft.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a drive line assembly comprising the steps of:
    (a) forming a driveshaft tube from a metallic material and having a substantially uniform wall thickness, said driveshaft tube terminating in an axially extending cylindrical end portion;
    (b) forming a diameter reducing portion from a metallic material and having a substantially uniform wall thickness, said diameter reducing portion including an axially extending cylindrical first end which is co-axial with and permanently fixed to said axially extending cylindrical end portion of said driveshaft tube, said diameter reducing portion further including an axially extending cylindrical second end, said axially extending cylindrical first end of said diameter reducing portion defining a first diameter, said axially extending cylindrical second end of said diameter reducing portion defining a second diameter, said first diameter being larger than said second diameter; and
    (c) forming a tube yoke from a metallic material and including a pair of opposed lug ears having respective orifices formed therethrough, said tube yoke including an axially extending cylindrical end portion which is co-axial with and permanently fixed to said axially extending cylindrical second end of said diameter reducing portion for axial and rotational movement therewith.

2. The method defined in claim 1 wherein said driveshaft tube is formed from an aluminum alloy.

3. The method defined in claim 1 wherein said diameter reducing portion is formed from an aluminum alloy.

4. The method defined in claim I wherein said tube yoke is formed from an aluminum alloy.

5. The method defined in claim 1 wherein said driveshaft tube, said diameter reducing portion, and said tube yoke are all formed from an aluminum alloy.

6. The method defined in claim 1 wherein said driveshaft tube is welded to said diameter reducing portion.

7. The method defined in claim I wherein said diameter reducing portion is formed homogeneously with said tube yoke.

8. The method defined in claim 1 wherein said driveshaft tube is welded to said diameter reducing portion and said diameter reducing portion is formed homogeneously with said tube yoke.

9. The method defined in claim 1 wherein said first diameter is about five inches and said second diameter is about four inches.

10. The method defined in claim 1 further including a universal joint assembly connected with said tube yoke.

11. A method of manufacturing a drive line assembly comprising the steps of:

(a) forming a driveshaft tube from a metallic material and having a substantially uniform wall thickness, said driveshaft tube terminating in an axially extending end portion; and (b) forming a tube yoke from a metallic material and including a homogenous diameter reducing portion having a substantially uniform wall thickness, said diameter reducing portion including an axially extending first end which is co-axial with and permanently fixed to said axially extending end portion of said driveshaft tube, said diameter reducing portion further including an axially extending second end, said axially extending first end of said diameter reducing portion defining a first diameter, said axially extending second end of said diameter reducing portion defining a second diameter, said first diameter being larger than said second diameter, said tube yoke further including a pair of opposed lug ears extending from said second end of said diameter reducing portion and having respective orifices formed therethrough.

12. The method defined in claim 11 wherein said axially extending end portion of said driveshaft tube and said axially extending first end of said diameter reducing portion are cylindrical.

13. The method defined in claim 11 wherein said axially extending first end of said diameter reducing portion and said axially extending second end of said diameter reducing portion are cylindrical.

14. The method defined in claim 11 wherein said driveshaft tube is formed from an aluminum alloy.

15. The method defined in claim 11 wherein said tube yoke is formed from an aluminum alloy.

16. The method defined in claim 11 wherein said driveshaft tube and said tube yoke are both formed from an aluminum alloy.

17. The method defined in claim 11 wherein said driveshaft tube is welded to said first end of said diameter reducing portion of said tube yoke.

18. The method defined in claim 11 wherein said first diameter is about five inches and said second diameter is about four inches.

19. The method defined in claim 11 further including a universal joint assembly connected with said tube yoke.

20. A method of manufacturing a drive line assembly comprising the steps of:

(a) forming a driveshaft tube from a metallic material and including a homogeneous diameter reducing portion having a substantially uniform wall thickness, said diameter reducing portion including an axially extending cylindrical first end extending from said driveshaft tube, said diameter reducing portion further including an axially extending cylindrical second end, said axially extending cylindrical first end of said diameter reducing portion defining a first diameter, said axially extending cylindrical second end of said diameter reducing portion defining a second diameter, said first diameter being larger than said second diameter; and (b) forming a tube yoke from a metallic material and including an axially extending cylindrical end portion having a substantially uniform wall thickness which is co-axial with and permanently fixed to said axially extending cylindrical second end portion of said diameter reducing portion of said driveshaft tube, said tube yoke further including a pair of opposed lug ears extending from said end portion and having respective orifices formed therethrough.

21. The method defined in claim 20 wherein said driveshaft tube is formed from an aluminum alloy.

22. The method defined in claim 20 wherein said tube yoke is formed from an aluminum alloy.

23. The method defined in claim 20 wherein said driveshaft tube and said tube yoke are both formed from an aluminum alloy.

24. The method defined in claim 20 wherein said diameter reducing portion of said driveshaft tube is welded to said tube yoke.

25. The method defined in claim 20 wherein said first diameter is about five inches and said second diameter is about four inches.

26. The method defined in claim 20 further including a universal joint assembly connected with said tube yoke.

* * * * *

UNITED STATES PATENT AND TRADEMARK OFFICE
CERTIFICATE OF CORRECTION

PATENT NO. : 6,001,018
DATED : December 14, 1999
INVENTOR(S) : Douglas E. Breese It is certified that error appears in the above-identified patent and that said Letters Patent is hereby corrected as shown below:

Column 9, Claim 10, line 1, delete the word "further" and after the word "including" add the words -- the further step of connecting --; Column 9, Claim 10, line 2, delete the word "connected".

Column 10, Claim 19, line 1, delete the word "further" and after the word "including" add the words -- the further step of connecting --; Column 10, Claim 19, line 2, delete the word "connected".

Column 10, Claim 26, line 1, delete the word "further" and after the word "including" add the words -- the further step of connecting --; Column 10, Claim 26, line 2, delete the word "connected".

Signed and Sealed this

Twenty-fifth Day of July, 2000

Attest:

Q. TODD DICKINSON

Attesting Officer

Director of Patents and Trademarks